(12) United States Patent
Mills

(10) Patent No.: US 9,552,000 B2
(45) Date of Patent: Jan. 24, 2017

(54) BATCH AUTHORING TOOL AND BIOREACTOR CONTROL SYSTEM

(75) Inventor: David R. Mills, Newton, MA (US)

(73) Assignee: GE HEALTHCARE BIO-SCIENCES CORP., Piscataway, NJ (US)

( * ) Notice: Subject to any disclaimer, the term of this patent is extended or adjusted under 35 U.S.C. 154(b) by 758 days.

(21) Appl. No.: 13/807,033

(22) PCT Filed: Jun. 30, 2011

(86) PCT No.: PCT/US2011/042605
§ 371 (c)(1),
(2), (4) Date: Dec. 27, 2012

(87) PCT Pub. No.: WO2012/003324
PCT Pub. Date: Jan. 5, 2012

(65) Prior Publication Data
US 2015/0025685 A1    Jan. 22, 2015

Related U.S. Application Data

(60) Provisional application No. 61/359,956, filed on Jun. 30, 2010.

(51) Int. Cl.
*G05D 21/02* (2006.01)
*G05B 19/418* (2006.01)
*G05B 15/02* (2006.01)

(52) U.S. Cl.
CPC .............. *G05D 21/02* (2013.01); *G05B 15/02* (2013.01); *G05B 19/41865* (2013.01); *G05B 2219/32096* (2013.01); *G05B 2219/32287* (2013.01); *Y02P 90/18* (2015.11); *Y02P 90/20* (2015.11)

(58) Field of Classification Search
CPC .............. G05B 19/41865; G05B 2219/32096; G05B 21/02; G05B 15/02; G05B 2219/32287
(Continued)

(56) References Cited

U.S. PATENT DOCUMENTS 6,049,764 A * 4/2000 Stahl .................... G05B 13/028
                                                        700/104
6,398,957 B1 * 6/2002 Mandt .................. C02F 3/1263
                                                        210/195.1
(Continued)

FOREIGN PATENT DOCUMENTS

WO    WO 2010/002745    1/2010

*Primary Examiner* — Shogo Sasaki
(74) *Attorney, Agent, or Firm* — Grogan, Tuccillo & Vanderleeden, LLP

(57) ABSTRACT

A bioreactor control system comprises a batch server for controlling a bioreactor system in response to a recipe, a batch software system for generating a control sequence for the bioreactor system via the batch server for implementing the recipe, and a recipe conversion system that inputs the recipe into the batch software system. Preferably, the recipe conversion system reads a word processor file containing the recipe and interprets styles applied to text in the word processor file as indicating equipment and phases of the recipe to the recipe conversion system. Generally, the bioreactor system includes one or more bioreactors and additional hardware to perform the upstream and downstream processing. The document properties of the word processor file containing the recipe are applied as header information for the recipe input into the batch software system. This system solves a problem associated with traditional batching software systems, in which the authoring of recipes on the systems can be relatively arcane. Here, the recipe can be authored on a common word processor.

5 Claims, 5 Drawing Sheets

(58) Field of Classification Search
USPC .................................. 702/19–32; 700/266
See application file for complete search history.

(56) References Cited

U.S. PATENT DOCUMENTS

| | | | | |
|---|---|---|---|---|
| 6,697,740 B2* | 2/2004 | Smith | .................... | G05B 21/02 |
| | | | | 435/286.5 |
| 2002/0178380 A1* | 11/2002 | Wolf | .................. | H04L 41/0213 |
| | | | | 726/4 |
| 2003/0023707 A1 | 1/2003 | Ryan | | |
| 2003/0055862 A1* | 3/2003 | Bhat | ..................... | G06F 9/4843 |
| | | | | 718/101 |
| 2003/0110447 A1* | 6/2003 | Froyd | ....................... | G06F 9/54 |
| | | | | 715/222 |
| 2003/0158675 A1 | 8/2003 | Smith | | |
| 2005/0108634 A1* | 5/2005 | Sahota | ............... | H04N 21/4782 |
| | | | | 715/239 |
| 2006/0259964 A1* | 11/2006 | Maldonado | ........... | G06F 21/604 |
| | | | | 726/16 |
| 2009/0265025 A1 | 10/2009 | Brown | | |

* cited by examiner

BATCH AUTHORING TOOL AND BIOREACTOR CONTROL SYSTEM

CROSS-REFERENCE TO RELATED APPLICATIONS

This application is a filing under 35 U.S.C. 371 of international application number PCT/US2011/042605, filed Jun. 30, 2011, published on Jan. 5, 2012 as WO 2012/003324, which claims priority to U.S. provisional patent application No. 61/359,956 filed Jun. 30, 2010.

RELATED APPLICATIONS

This application claims the benefit under 35 USC 119(e) of U.S. Provisional Application No. 61/359,956, filed on 30 Jun. 2010 and the teachings of which are incorporated here in by reference in its entirety.

BACKGROUND OF THE INVENTION

Bioreactor systems are used to produce biochemically active substances derived from organisms. Bioreactors are commonly tank systems including pumps, agitation systems, air distribution systems and sensors. Traditionally, bioreactors were designed as stationary reusable tanks or containers. More recently, disposable bioreactors, which may utilize plastic sterile bags, are becoming increasingly common. Disposable, single-use manufacturing systems can be assembled from component pieces (e.g. tubing, filters, bags, fittings, connectors, sensors, etc) into disposable assemblies. Component pieces and portable assembly capabilities provide advantages such as flexibility to rapidly change the configuration of the assembly. Bioreactor systems commonly include additional hardware to perform the upstream and downstream processing.

Exemplary downstream processing includes: harvest/clarification, chromatography, and ultrafiltration/diafiltration (UF/DF). When a bioreactor is ready to be harvested, the contents are often clarified. In one example, a peristaltic pump is used to transfer the contents of the bioreactor through a depth filter system and a disposable capsule filter to remove large molecules with high molecular weight from cells, cell debris, colloids and particles. Chromatography is a physical method of separation in which the components to be separated are distributed between two phases, one of which is stationary while the other (mobile) moves in a defined direction. Chromatography involves a product to be separated (purified) over a stationary support (resin). The molecules in the product will have different interactions (capture, purification, and polishing) with the stationary support leading to separation of similar molecules. Examples of liquid chromatography are Affinity, Hydrophobic Interaction "HIC", and Ion-Exchange. UF/DF (Tangential Flow Filtration) steps are used to clarify, reduce batch volumes (concentration) and exchange buffers (diafiltration) for efficient column operation or final formulation. In Tangential Flow Filtration (TFF), the fluid is pumped tangentially along the surface of the membrane. An applied pressure (transmembrane pressure) serves to force a portion of the fluid through the membrane to the filtrate side. Particulates and macromolecules that are too large to pass through the membrane pores are retained but do not build up at the surface of the membrane. Instead, they are swept along by the tangential flow.

Exemplary upstream processing includes the processing associated with buffer and media preparation. Preparation of the bioreactor usually begins with the preparation of the inoculum which proceeds in scale-up steps until enough inoculum is made to aseptically inoculate the final, sterile, media-filled bioreactor.

Manufacturing Execution System (MES) software is used to provide real-time access to plant activities that include equipment, labor, orders and inventory. A MES integrates the data with enterprise resource planning (ERP) systems to enable control over the factory floor and supply chain.

Batching software systems are typically one component of the MES that are used to specify batching processes for bioreactor systems, including the upstream and downstream processing. The batching software systems are also used to create and manage recipes and execute them automatically on the bioreactor systems. The batching software also facilitates validation of recipes and configuration of the physical equipment. During the execution of the recipes, the batching software systems further usually collect detailed electronic batch data about the processes and generate detailed reports. Examples of batching software include InBatch by WONDERWARE®, PI System by OSISOFT®, PROFICY® Batch Execution by General Electric Company, SIMATIC PCS 7® process control system by Siemens, and FACTORY TALK® by Rockwell Automation, Inc.

SUMMARY OF THE INVENTION

The problem with traditional batching software systems is that the authoring of recipes on the systems can be relatively arcane. As a result, in larger companies, staff is often dedicated to authoring the recipes for the bioreactor systems in the batching software. In smaller companies, consultants are usually hired to author the recipes in the batching software since new recipes are typically required only infrequently. Both scenarios contribute to the cost of deploying the recipes to the bioreactor systems. On the other hand, the companies that market and sell the commercially available batching software systems seem uninterested in improving the usability of the software from the standpoint of recipe authoring. Instead, the focus is typically directed toward adding new features, which make the software even more complex to use by non-specialists.

In general, according to one aspect, the invention features a bioreactor control system. The system comprises a batch server for controlling a bioreactor system, which can include one or more bioreactors and/or additional hardware to perform the upstream and downstream processing, in response to a recipe, a batch software system for generating a control sequence for the bioreactor system for implementing the recipe, and a recipe conversion system that inputs the recipe into the batch software system.

In preferred embodiments, the recipe conversion system reads a word processor file containing the recipe. Styles applied to text in the word processor files indicate equipment and phases of the recipe to the recipe conversion system and document properties of the word processor file are applied as header information for the recipe that is input into the batch software system. Preferably, the file is an XML file and the batch software system is InBatch batching software.

In general, according to another aspect, the invention features a method for controlling a bioreactor system. The method comprises authoring a recipe on a word processor, translating the recipe from the word processor for a batch software system, and downloading the recipe from the batch software system to a batch server for controlling a bioreactor system.

In general, according to another aspect, the invention features a computer software product for generating a recipe for bioreactor control. The product comprises a computer-readable medium in which program instructions are stored, which instructions, when read by a computer, cause the computer to translate a recipe contained in file for a batch software system.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
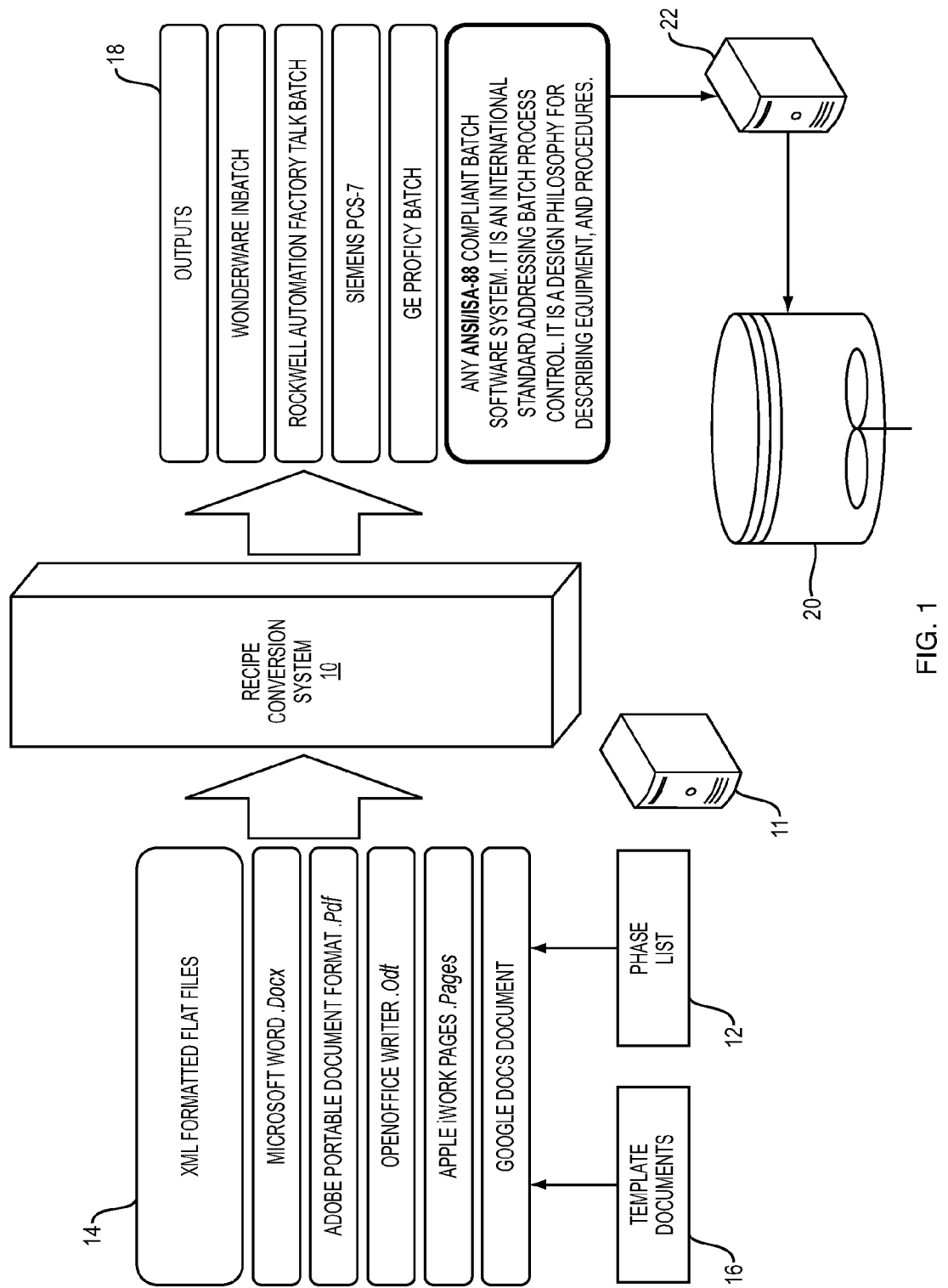
FIG. 1 is a schematic diagram illustrating the process of converting word processor files detailing the desired recipe and then implementing that recipe in a bioreactor system, according to the present invention.

FIG. 1 shows the overall process of importing the word processor files 14 detailing the desired recipe into the recipe conversion system 10. This generates the input to the batching software system 18 to create a valid master recipe. The batching software system 18 executes on a batch server 22 that controls a bioreactor system 20, which includes one or more bioreactors and additional hardware to perform the upstream and downstream processing. The batching software system 18 generates a control sequence executed by the batch server 22 for the bioreactor system 20 for implementing the master recipe.

The recipe conversion system 10 is typically a software application program that executes on a computer system 11. It is installed on the computer system 11, which typically also executes the batching software system 18 and a recipe editor of the batching software system. In another example, the recipe is uploaded to the batch server 22. The recipe conversion system 10 is typically loaded onto the computer system 11 and stored to its hard drive via compact disk or via a download over the internet.

In the current embodiment, the word processor files 14 use the DOCX file format introduced in Microsoft Word 2007. The DOCX format is a compressed directory containing several XML files. These XML files act to separate the formatting of the document from the informational content. This format provides flexibility to create differently formatted recipe documents while still allowing the recipe conversion system 10 to extract the information required to construct the master recipe for the batching software 18. The context for this information is provided to the recipe conversion system 10 through the use of custom document properties and styles.

In other embodiments, the recipe word processor files 14 are authored using different word processing systems. In a generic example, the files are XML formatted flat files. In more specific examples, the files are authored using: Adobe Acrobat and saved in the form of an Adobe portable document format, OpenOffice Writer and saved in the ODT format, Apple iWork Pages and saved in the .Pages format, or Google Apps Docs document.

A phase list 12 is preferably generated for each module type in the bioreactor system 20. The phase list covers one or more bioreactors and upstream and downstream processing modules including harvest/clarification modules, chromatography modules, ultrafiltration/diafiltration (UF/DF) modules, buffer and media preparation modules and modules for the preparation of the inoculum. This list details the set of phases that the recipe conversion system 10 expects to be used for each of the modules of the target bioreactor system 20. The phase list 12 explains what the phase does in the module when executed and also details all parameters associated with the phase, range of possible values and usage of each parameter. The phase list is typically generated once when the bioreactor system 20 is initially constructed or updated after modifications to the system 20 and will act as a reference document for future recipe construction.

A template recipe document 16 is provided for each module type present in the bioreactor system 20, which includes one or more bioreactors and additional hardware to perform the upstream and downstream processing. The template document 16 illustrates the construction of the recipe document by example. The formatting of the template document is somewhat flexible, but the custom document properties and styles must be used in order for the recipe conversion system 10 to properly convert the word processor files 14 into a master recipe for the batching software system 18. Using a recipe template document 16 and the phase list 12, the user can modify an existing recipe or create a new recipe.

In operation, the recipe conversion system 10 reads in the word processor files 14 and runs an instance of the batching software system in the background. It reads the custom document properties of the word processor files 14 in order to provide recipe header information of the master recipe. The body of the document 14 uses styles to provide context to the different recipe components. These components include: equipment, operations, phases, phase parameters, phase instructions, supervisor approval, "Performed By" security requirement, and "Verified By" security requirement.

Each of these components has a custom paragraph style associated with it. Once the recipe is imported into the batching server 22, it can be used over and over without the need to revisit the word processor files 14. Edits can be made to existing recipes by modifying the original word processor files 14 and re-importing the file using the recipe conversion system 10.

Figure 2:
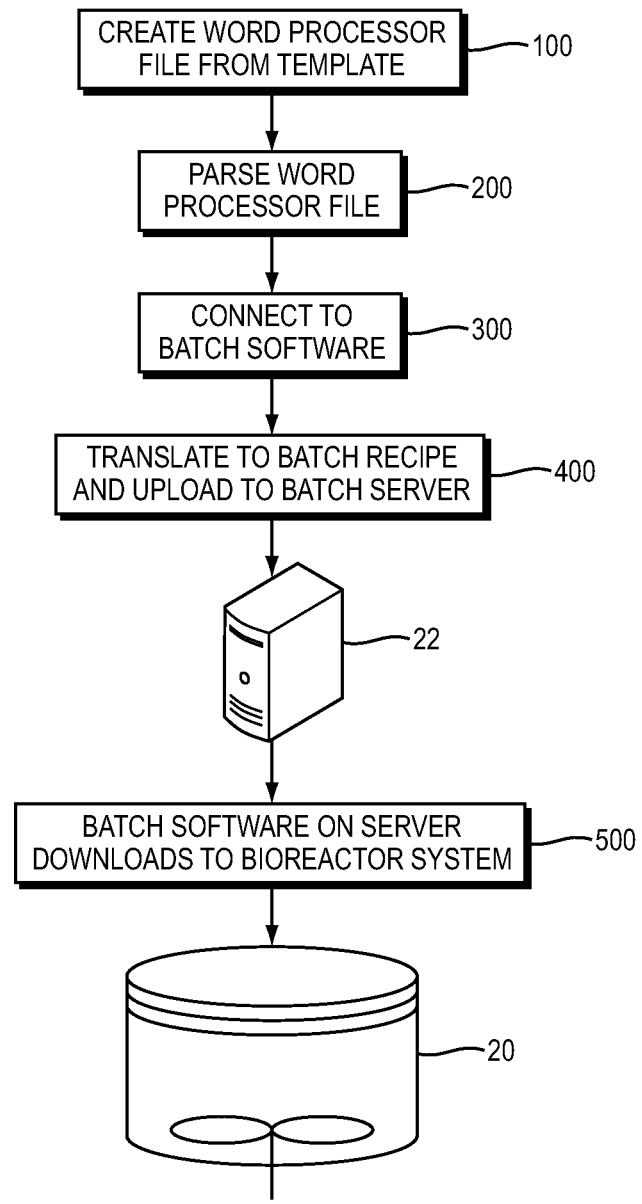
FIG. 2 is a flow diagram illustrating the overall process of authoring and processing a recipe using the recipe conversion system.

FIG. 2 illustrates the overall process of authoring and processing a recipe using the recipe conversion system 10.

In step 100, the word processor file 14 is created from the template 16. In step 200, the recipe conversion system 10 reads in the word processor file 14 and parses it. It then connects to the batch software system 18 in step 300. The recipe conversion system 10 then translates the word processor file 14 into a batch recipe that is uploaded to the batch server 22 in step 400. In step 500, the master recipe on the batch server 22 executes the recipe on the bioreactor system 20, which includes one or more bioreactors and additional hardware to perform the upstream and downstream processing, in order to carry out the recipe.

Figure 3:
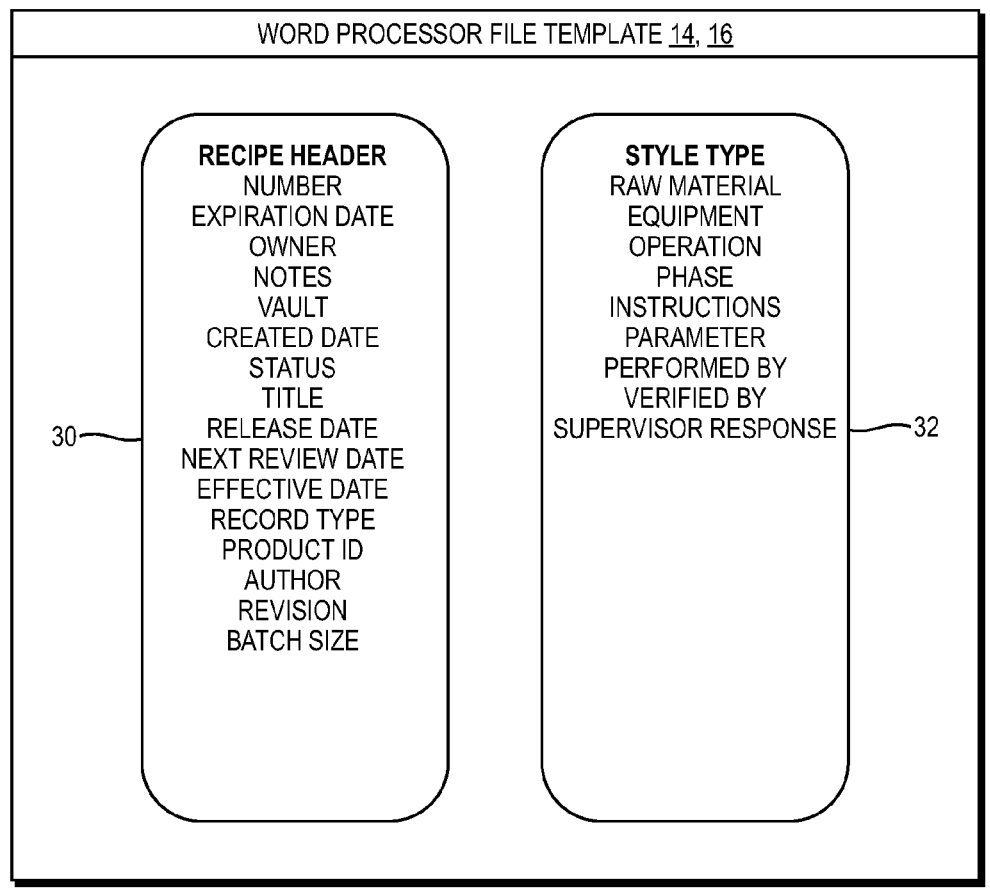
FIG. 3 illustrates the organization of the word processor file and word processor file template relative to the recipe header information and style types defined in the files.

FIG. 3 illustrates the organization of the word processor file 14 and word processor file template 16.

The files are generally organized into a recipe header 30 and the style types 32.

The recipe header 30 contains a number of fields including number, expiration date, owner, notes, vault, created date, status, title, release date, next review date, effective date, record type, product identification, author, revision, and batch size. This header information is stored, in the current embodiment, in the document properties of the word processor file 14 and word processor file template 16.

The following Table I shows the mapping of document properties to recipe header information. This example is specific to the InBatch software.

TABLE 1

| Word Document Custom Property | InBatch Recipe Header Field |
|---|---|
| Number | RecipeID = MC_Number.MC_Revisio |
| ExpirationDate | (not used) |
| Owner | (not used) |
| Notes | Header Comments |
| Vault | (not used) |
| CreatedDate | (not used) |
| Status | Recipe State: "Production" or "Release" |
| Title | RecipeName |
| ReleaseDate | (not used) |
| NextReviewDate | (not used) |
| EffectiveDate | Version Comments |
| RecordType | Recipe Type: "Product" or "Test" |
| ProductIdentification | ProductID |
| Author | Author |
| Revision | RecipeID = MC_Number.MC_Revisio |
| BatchSize | Default Batch Size Maximum Batch Size Minimum Batch Size |

The unique identifier for an InBatch recipe (RecipeID) is formed from appending the Number with Revision properties with a dot (".") character in between. Other fields are used as shown in the table. Possible Recipe Types and States are defined in InBatch.

In the current embodiment, the custom style types 32 include raw material, equipment, operation, phase, instructions, parameter, performed by, verified by, and supervisor response. These style types encode the information required to construct the master recipe for the batching software 18.

In more detail, Microsoft Word and the other word processing programs discussed previously have the ability to define custom paragraph styles. These are used to identify context within the recipe document 14.

The Equipment style is used to identify the Process Class (module type) required for the recipe. The actual module used for the recipe at runtime can be assigned using the batching software 18. This style simply identifies the type of module that the recipe was written for. The table below shows an example of one possible use of the Equipment Style. The upper left cell of Table 2 has the Equipment style applied. Therefore, the recipe conversion system 10 then reads the contents contained in that style ("Harvest") to know that Harvest is the module type required for this recipe. Other cells of the following table would be ignored since they have no custom style applied.

The possible equipment specified by the equipment style spans all aspects of the bioreactor system 20. This includes one or more bioreactors and the additional hardware to perform the upstream and downstream processing, such as: harvest/clarification, chromatography, and ultrafiltration/diafiltration (UF/DF), equipment for buffer and media preparation, and equipment for the preparation of the inoculum.

Note: The text in the Equipment style has been shown underlined for clarity only. Clicking inside the cell in the table will indicate the applied style in the Style section in the Microsoft Word toolbar.

Recipe Sample Text:

TABLE 2

| Equipment | Equipment Identification # | Recal Due Date, if applicable | Clean date, if applicable | Initials/Date |
|---|---|---|---|---|
| Harvest | | | | |
| Millistak+ Pod holder and hardware | | NA | | |
| Pressure sensors | | | NA | |
| Pressure sensors | | | NA | |
| Watson Marlowe Peristaltic Pump | | NA | | |

The Operation Style identifies the beginning of a new Operation within the recipe procedure. Operations contain phases. It is based on the Header2 style and therefore automatically generates a 2-field number (e.g. 2.3) which will be used as a label within the InBatch recipe procedure. This label identifies the operation within the procedure and is recorded in the batch record. Operation text is limited to 16 Alphanumeric characters.

Note: the text in Operation style is shown underlined for clarity in Table 3 below.

Recipe Sample Text:

(1) For purposes of measurements of reagents for this procedure, assume that 1 L=1 kg.

(2) If any of the required components listed are not available, it is allowable to use a comparable substitution with supervisor approval. Note any substitutions in the comments section.

(3) Use aseptic technique for taking all samples and making all connections.

2.3 Set Up

TABLE 3

| Action | Performed By: (Initials/Date) | Verified By: (Initials/Date) |
|---|---|---|
| 2.3.1 Part<br>Obtain 2 Millistak+ POD DOHC grade depth filters (1.1 m$^2$) P/N: 999-GMP-677.11. Enter information for the first filter here.<br>PartNo (999-GMP-677.11): _____<br><br>LotNo.: _____<br>ExpDate: _____ | | |

The Phase style indicates the name of a phase. The name of the phase is stored in the phase list 12 and must be a valid phase for the batching software system 18 for the target module of the bioreactor system 20. Phase names are limited to 16 Alphanumeric characters. Microsoft Word will not enforce the character limit, nor ensure that the text corresponds to the name of a valid phase. The Phase style is derived from Heading3, and automatically generates a 3-part paragraph number which is used as a label in the batching software 18. The label uniquely identifies the phase within the recipe procedure and is captured in the batch record.

NOTE: For clarity, the text in Phase style ("Part") is shown underlined in the sample text below in Table 4.

Recipe Sample Text:
(1) For purposes of measurements of reagents for this procedure, assume that 1 L=1 kg.
(2) If any of the required components listed are not available, it is allowable to use a comparable substitution with supervisor approval. Note any substitutions in the comments section.
(3) Use aseptic technique for taking all samples and making all connections.

2.4 Set Up

TABLE 4

| Action | Performed By: (Initials/Date) | Verified By: (Initials/Date) |
|---|---|---|
| 2.4.1 Part<br>Obtain 2 Millistak+ POD DOHC grade depth filters (1.1 m$^2$) P/N: 999-GMP-677.11. Enter information for the first filter here.<br>PartNo (999-GMP-677.11): _____<br><br>LotNo.: _____<br>ExpDate: _____ | | |

The Instructions style indicates phase instructions. Any paragraphs in the Instructions style are added to the current Phase in the recipe procedure. A single phase may have multiple Instruction paragraphs. The instruction text is captured as plain text. No formatting information (e.g. bold, italics, font colors, sizes, etc.) is captured since the phase instructions for the batching software 18 are stored in plain text within the recipe database in the example of InBatch.

NOTE: For clarity, the text in Instructions style is shown underlined in the sample text below in Table 5.

Recipe Sample Text:
(1) For purposes of measurements of reagents for this procedure, assume that 1 L=1 kg.
(2) If any of the required components are not available, it is allowable to use a comparable substitution with supervisor approval. Note any substitutions in the comments section.
(3) Use aseptic technique for taking all samples and making all connections.

2.5 Set Up

TABLE 5

| Action | Performed By: (Initials/Date) | Verified By: (Initials/Date) |
|---|---|---|
| 2.5.1 Part<br>Obtain 2 Millistak+ POD DOHC grade depth filters (1.1 m$^2$) P/N: 999-GMP-677.11. Enter information for the first filter here.<br>PartNo (999-GMP-677.11): _____<br><br>LotNo.: _____<br>ExpDate: _____ | | |

The Parameter style indicates phase parameters. The name of the parameter must be valid for the current phase in the recipe procedure. Parameter names are limited to 16 Alphanumeric characters. Microsoft Word will not enforce the character limit, nor ensure that the text corresponds to the name of a valid parameter. A phase can have multiple parameter "paragraphs". Each paragraph corresponds to a separate parameter within the phase. Only the first characters up to any non-Alphanumeric text are used for the parameter name. The period character (used for abbreviations) is ignored. Text following the parameter name in parenthesis is used as a target value for the parameter. Not all parameters require a target value. The blanks (underscores) following the parameters in the example below are ignored by the recipe conversion system 10.

NOTE: For clarity, the text in Parameter style is shown underlined in the sample text below in Table 6. The text "999-GMP-677.11" will be used as the target value for the PartNo parameter on this phase.

Recipe Sample Text:
(1) For purposes of measurements of reagents for this procedure, assume that 1 L=1 kg.
(2) If any of the required components are not available, it is allowable to use a comparable substitution with supervisor approval. Note any substitutions in the comments section.
(3) Use aseptic technique for taking all samples and making all connections.

Set Up

TABLE 6

| Action | Performed By: (Initials/Date) | Verified By: (Initials/Date) |
|---|---|---|
| Part<br>Obtain 2 Millistak+ POD DOHC grade depth filters (1.1 m$^2$) P/N: 999-GMP-677.11. Enter information for the first filter here.<br>PartNo (999-GMP-677.11): _____<br><br>LotNo.: _____<br>ExpDate: _____ | | |

The mere presence of the Performed By style within a phase indicates that when this phase executes, it requires an electronic signature from the operator when the phase completes. The table cell in the "Performed By" column is where this paragraph style is applied, but technically it can be anywhere within the phase text. In practice, the phases which do not require electronic signature have been colored dark in the sample recipes, but this is not applied by the style automatically. It is done as a visual indication only. This style element is optional. Not all phases in the procedure will require Performed By. Only one is required. However if multiple Performed By styles are encountered within a single phase, this is not harmful and no error is generated.

The mere presence of the Verified By style within a phase indicates that when this phase executes, it requires an electronic signature from the operator and supervisor when the phase completes. "Verified By" implies "Performed By", so when Verified By is set, both signatures are required. The table cell in the "Verified By" column is where this paragraph style is applied, but technically it can be anywhere within the phase text. This style element is optional. Not all phases in the procedure will require Verified By. Only one is required. However if multiple Verified By styles are encountered within a single phase, this is not harmful and no error is generated.

The mere presence of the Supervisor Response style within a phase indicates that when this phase executes, it requires a comment to be entered by the supervisor before the recipe can continue. This style can be applied to any text and is indicated by underlining below in the recipe sample text of Table 7. In the example below, it is applied to text that actually explains this to the operator. This style element is optional. Not all phases in the procedure will require Supervisor Response. Only one is required. However if multiple Supervisor Response styles are encountered within a single phase, this is not harmful and no error is generated.

Recipe Sample Text.:
(1) For purposes of measurements of reagents for this procedure, assume that 1 L=1 kg.
(2) If any of the required components are not available, it is allowable to use a comparable substitution with supervisor approval. Note any substitutions in the comments section.
(3) Use aseptic technique for taking all samples and making all connections.

2.7 Set Up

TABLE 7

| Action | Performed By: (Initials/Date) | Verified By: (Initials/Date) |
| --- | --- | --- |
| 2.7.1 Part Obtain 2 Millistak+ POD DOHC grade depth filters (1.1 m²) P/N: 999-GMP-677.11. Enter information for the first filter here. PartNo (999-GMP-677.11): | | |
| LotNo.: _____ | | |
| ExpDate: _____ | | |
| Supervisor Response is Required | | |

The order in which the style elements appear in the document is very important. The Equipment style must appear first. This tells the recipe conversion system 10 which class of module bioreactor system 20 will be used and therefore, which set of phases are appropriate for the rest of the document.

Upon encountering this element, the recipe conversion system 10 creates the Equipment Requirement in the recipe software 18 and starts a unit procedure on the equipment instance.

The next custom style element to appear should be the Operation style. There can be any number of Operation elements within a single recipe document. When this element is encountered in the document, the recipe conversion system 10 creates a new operation within the current Unit Procedure.

After an Operation element, any number of Phase elements can be used. The application appends the phase to the end of the current Operation within the recipe procedure in the recipe software 18.

After the phase element, the Parameter, Performed By, Verified By, and Supervisor Response styles can be used in any order. The data for each of these elements apply to the current phase.

To Summarize, the general order of custom style elements within a document is shown in the following diagram:
Equipment (1 per doc)
Operation
Phase
[Parameter, Performed By, Verified By, or Supervisor Response]
[Parameter, Performed By, Verified By, or Supervisor Response]
[Parameter, Performed By, Verified By, or Supervisor Response]
. . .
Phase
[Parameter, Performed By, Verified By, or Supervisor Response]
[Parameter, Performed By, Verified By, or Supervisor Response]
[Parameter, Performed By, Verified By, or Supervisor Response]
. . .
Phase . . .
Operation
Phase
[Parameter, Performed By, Verified By, or Supervisor Response]
[Parameter, Performed By, Verified By, or Supervisor Response]
[Parameter, Performed By, Verified By, or Supervisor Response]
. . .
Phase . . .
Operation
Phase . . .

Figure 4:
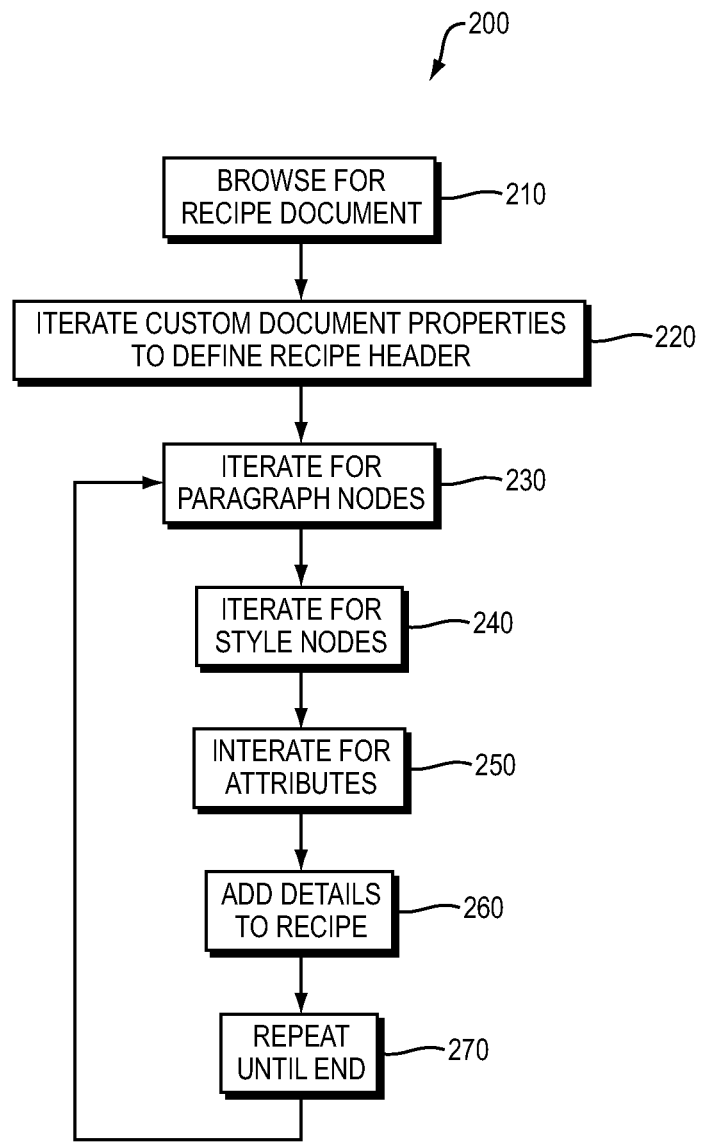
FIG. 4 is a flow diagram illustrating the process of parsing the recipe document by the recipe conversion system.

Errors are logged to an Input Log list, but will not halt operation. The following are errors that are signaled by the recipe conversion system 10: 1. text in the Equipment style does not correspond to a valid InBatch Process class; 2) InBatch could not add a Unit Procedure for the Equipment; 3) InBatch could not add an Operation based on the Operation Style text; 4) Text in the Phase style does not correspond to a valid InBatch Process phase for the Equipment selected; 5) InBatch could not add Process Phase based on text in the Phase style; 6) InBatch could not create a Phase Label based on the Phase style; 7) InBatch could not set the target value of a Phase Parameter based on text in the Parameter style; 8) InBatch was not able to Save the recipe; 9) InBatch was not able to Validate the recipe; 10) InBatch was not able to Close the recipe FIG. 4 illustrates the process of parsing 200 the recipe document 14 by the recipe conversion system 10.

In more detail, in step 210, the user browses for the desired recipe document 14. The recipe conversion system 10 reads in the recipe document 14 and iterates the custom document properties to define the recipe header information that is input into the batching software system 18. This involves the mapping of the document header to the recipe based on the mapping illustrated in table 1 above.

The recipe conversion system 10 then iterates for paragraph nodes in step 230. It then determines the style nodes in step 240, and the attributes in step 250. The details are added to the recipe in 260 using the context or style applied to the word process file text as recipe information to the batching software system 10. This process repeats for the next paragraph until the end is reached in step 270.

Figure 5:
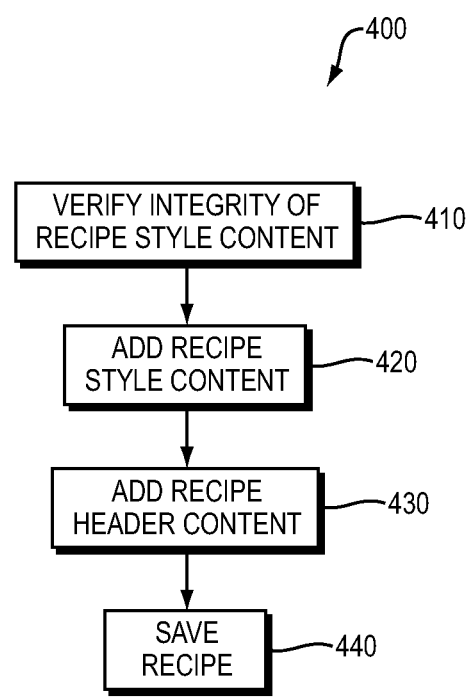
FIG. 5 is a flow diagram illustrating the process of translating to the batch recipe.

FIG. 5 illustrates the process of translating to the batch recipe in step 400 of FIG. 2

First, the integrity of the recipe style content is verified in step 410. Any recipe style content is then added in step 420. The header content is added in step 430. Finally, the recipe is saved on the batch server 22 and the recipe is executed on the bioreactor system 20 in step 440.

While this invention has been particularly shown and described with references to preferred embodiments thereof, it will be understood by those skilled in the art that various changes in form and details may be made therein without departing from the scope of the invention encompassed by the appended claims.

What is claimed is:

1. A bioreactor control system comprising:
    a bioreactor system including a bioreactor connected to at least one upstream processing module and to at least one downstream processing module, the upstream and downstream processing modules each including at least one of a harvest/clarification module, a chromatography module, an ultrafiltration/diafiltration (UF/DF) module, a buffer and media preparation module, and a module for preparation of an inoculums;
    a batch server that includes a batch software system that generates a control sequence based at least in part on a recipe, the control sequence configured to adapt the batch server to control the bioreactor system;
    a recipe authoring system for generating the recipe;
    a recipe conversion system that includes at least one processor configured to:
        read in a word processor file having a plurality of paragraphs that include instructions defining the recipe, at least one of the paragraphs having one or more applied custom paragraph styles;
        parse the word processor file by iterating through the plurality of paragraphs and identifying the one or more applied custom paragraph styles;
        generate the control sequence based at least in part on the instructions and the identified one or more applied custom paragraph styles; and
        wherein the one or more applied custom paragraph styles indicate at least one of a piece of equipment and at least one of an operational phase of the bioreactor system to be controlled by the batch server.

2. The bioreactor control system of claim 1, wherein document properties of the word processor file are applied as header information for the recipe.

3. The bioreactor control system of claim 1, wherein the recipe conversion system is configured to read a XML file defining the recipe.

4. The bioreactor control system of claim 1, wherein the batch software system is InBatch batching software.

5. The bioreactor control system of claim 1, wherein the batch software system is configured to download the recipe to the batch server.

* * * * *